(12) United States Patent
Wang et al.

(10) Patent No.: US 7,929,217 B2
(45) Date of Patent: Apr. 19, 2011

(54) PROJECTION LENS SYSTEM

(75) Inventors: Kuang-Ju Wang, Taipei Hsien (TW);
Chun-Hsiang Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/541,176

(22) Filed: Aug. 14, 2009

(65) Prior Publication Data

US 2010/0315726 A1 Dec. 16, 2010

(30) Foreign Application Priority Data

Jun. 16, 2009 (CN) .......................... 2009 1 0303307

(51) Int. Cl.
*G02B 3/00* (2006.01)
*G02B 9/00* (2006.01)
*G02B 13/18* (2006.01)
*G02B 3/02* (2006.01)
*G02B 13/04* (2006.01)

(52) U.S. Cl. .......................... 359/649; 359/753; 359/714
(58) Field of Classification Search ................. 359/649, 359/650, 714, 715, 770, 753, 781
See application file for complete search history.

(56) References Cited

U.S. PATENT DOCUMENTS

6,236,521 B1 * 5/2001 Nanba ........................... 359/715
2009/0316276 A1 * 12/2009 Hsu et al. ...................... 359/650
* cited by examiner

*Primary Examiner* — Alicia M Harrington
(74) *Attorney, Agent, or Firm* — Zhigang Ma (57) ABSTRACT

The present disclosure relates to a projection lens. The projection lens includes, in order from the magnified end to the minified end thereof, a first lens of negative refraction power, a second lens of positive refraction power, a third lens of negative refraction power, a fourth lens of positive refraction power, and a fifth lens of positive refraction power. The forth lens and the third lens are bonded to integrally form a compound lens of negative refraction power. The projection lens satisfies the following condition: $0.4<R_{12}/f<0.9$. Wherein, $R_{12}$ is a radius of curvature of the surface at the minified end of the first lens, f is an effective focal length of the projection lens.

9 Claims, 7 Drawing Sheets

PROJECTION LENS SYSTEM

BACKGROUND

1. Technical Field

The present disclosure relates to lens systems and, more particularly, to a projection lens system.

2. Description of Related Art

In order to obtain a clear projection image and reduce the size of projectors, such as, digital light processing (DLP) projectors, liquid crystal display (LCD) projectors, and liquid crystal on silicon (LCoS) projectors, projection lens systems with high resolution and short overall length are needed. But factors affecting both the resolution and the overall length of the projection lens system, such as the number and position of lenses employed, the refraction power distributions of the employed lenses, and the shape of the employed lenses, are complicated. For example, reducing the number of lenses can shorten the overall length of the projection lens system, but resolution of the projection lens system will suffer; conversely, increasing the number of lenses of the projection lens system can increase resolution of the projection lens system, but the overall length of the projection lens system is increased.

What is needed, therefore, is a projection lens system with compact size and good optical performance to overcome or at least alleviate the above problem.

BRIEF DESCRIPTION OF THE DRAWING

Many aspects of the present projection lens system can be better understood with reference to the following drawing. The components in the drawing are not necessarily drawn to scale, the emphasis instead being placed upon clearly illustrating the principles of the present projection lens system.

DETAILED DESCRIPTION

Embodiments of the present disclosure will now be described in detail below, with reference to the accompanying drawings.

Figure 1:
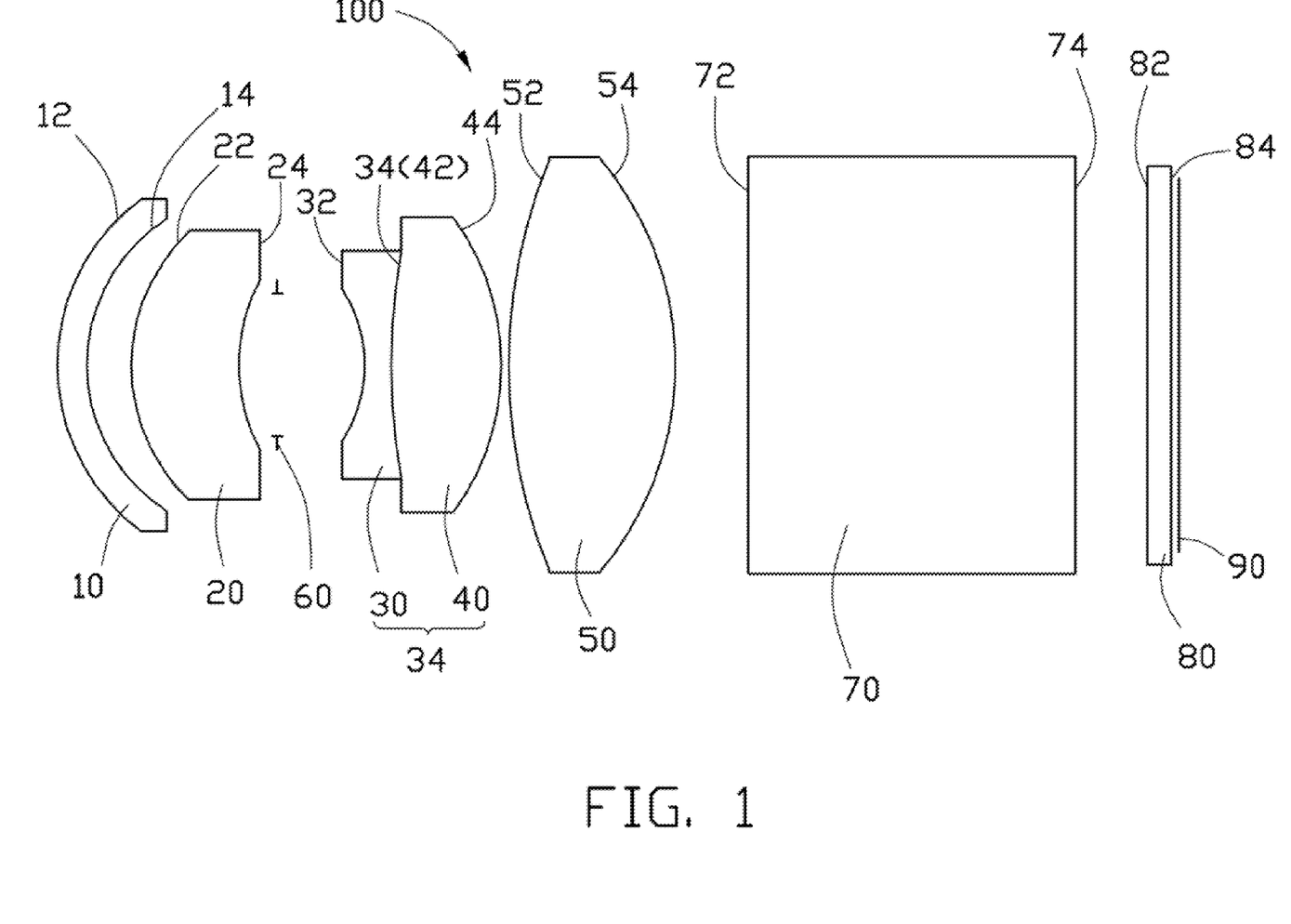
FIG. 1 is a schematic view of internal arrangement of a projection lens system according to an exemplary embodiment.

Referring to FIG. 1, a projection lens system 100 according to an exemplary embodiment is shown. The projection lens system 100 includes, in order from the magnified end to the minified end thereof, a first lens 10 with negative refraction power, a second lens 20 with positive refraction power, a third lens 30 with negative refraction power, a fourth lens 40 with positive refraction power, and a fifth lens 50 with positive refraction power.

In the embodiment, the projection lens system 100 is configured for utilization in a DLP projector. A spatial light modulator (SLM) 90, for example, a digital micromirror device (DMD), modulates light signals for projection through the projection lens system 100. The light signals are transmitted through the fifth lens 50, the fourth lens 40, the third lens 30, the second lens 20, and the first lens 10 in sequence, and then projected onto a projection surface (not shown) to produce images.

In the embodiment, all of the first lens 10, the second lens 20, and the fifth lens 50 are aspherical lenses.

The fourth lens 40 and the third lens 30 are integrally bonded to form a compound lens 34 with negative refraction power. The compound lens 34 can reduce distortion and bulk of the projection lens system 100.

The first lens 10 with negative refraction power, the second lens 20 with positive refraction power, the compound lens 34 with negative refraction power, and the fifth lens 50 with positive refraction power are configured to obtain a wide-angle projection ability to achieve a larger projected image in a limited space.

In the embodiment, both the third lens 30 and the fourth lens 40 of the projection lens system 100 are made of glass, while the first lens 10, the second lens 20, and the fifth lens 50 of the projection lens system 100 are made of plastic. The magnified-side surface 12 and the minified-side surface 14 of the first lens 10, the magnified-side surface 22 and the minified-side surface 24 of the second lens 20, and the magnified-side surface 52 and the minified-side surface 54 of the fifth lens 50 are all aspherical surfaces.

The above aspherical surfaces are shaped according to the formula:

$$x = \frac{ch^2}{1 + \sqrt{1 - (k+1)c^2h^2}} + \sum A_i h^i$$

wherein h is a height from the optical axis of the projection lens system 100 to the aspherical surface, c is a vertex curvature, k is a conic constant, and $A_i$ is i-th order correction coefficients of the aspheric surfaces.

In order to obtain low distortion, good imaging quality and a compact configuration, the projection lens system 100 satisfies the following condition:

$$0.4 < R_{12}/f < 0.9, \quad (1)$$

Wherein, $R_{12}$ is a radius of curvature of a minified-side surface 14 of the first lens 10; f is an effective focal length of the projection lens system 100. Condition (1) defines a shape of the minified-side surface of the first lens 10 to obtain a reduced distortion and a wide-angle projection ability.

Preferably, the projection lens system 100 further satisfies the following condition:

$$BFL/f > 0.85, \quad (2)$$

Wherein, BFL is a back focal length of the projection lens system 100, which is a distance between an SLM-side surface of the fifth lens 50 and the SLM 90. Condition (2) limits the back focal length of the projection lens system 100 to make other optical elements of the projector (e.g. a filter) installable between the fifth lens 50 and the SLM 90.

Preferably, the projection lens system 100 further satisfies the following condition:

$$0.8 < f_5/f < 1.2, \quad (3)$$

wherein $f_5$ is a focal length of the fifth lens 50. Condition (3) defines a dioptric strength of the fifth lens 50 with a small angle of incidence to work together with the SLM with a small angle of incidence.

The projection lens system 100 further includes an aperture stop 60 installed between the second lens 20 and the third lens 30. The aperture stop 60 is configured for adjusting light flux from the third lens 30 to the second lens 20. In addition, the aperture stop 60 facilitates uniform light transmission when light passes trough the third lens 30 to correct coma aberrations of the projection lens system 100. To minimize the manufacture cost and the total length of the projection lens system 100, the aperture stop 60 can be obtained by smearing an opaque material on an outer rim of the magnified-side surface 32 of the third lens 30. The projection lens system 100 further includes a prism 70 and a glass film 80 installed between the fifth lens 50 and the SLM 90 for adjusting the light path and protecting the surface of the SLM 90.

Example diagrams of the projection lens system 100 will be described below with reference to FIGS. 2-7. It is to be understood that the disclosure is not limited to these examples. The following are symbols used in each exemplary embodiment.

$F_{No}$: F number;
$2\omega$: field angle;
R: radius of curvature;
d: distance between surfaces on the optical axis of the projection lens system 100;
Nd: refractive index of lens; and
V: Abbe constant.

EXAMPLE

Embodiment 1: tables 1, 2 show specifications of a first embodiment of the projection lens system 100, wherein f=10.108, BFL=13.865649, $f_5$=9.529965, $F_{No}$=1.961832, $2\omega$=54°.

TABLE 1

| Surface | R (mm) | d (mm) | Nd | V |
|---|---|---|---|---|
| 12 | 6.845876 | 0.831851 | 1.531 | 55.75 |
| 14 | 4.868682 | 1.196053 | — | — |
| 22 | 4.968513 | 3.004715 | 1.607 | 26.65 |
| 24 | 5.91039 | 1.013895 | — | — |
| 60 | infinite | 2.389371 | — | — |
| 32 | −3.97193 | 0.8 | 1.847 | 23.78 |
| 34 (42) | 23.51483 | 2.958428 | 1.883 | 40.77 |
| 44 | −7.16358 | 0.2 | — | — |
| 52 | 12.9186 | 4.605687 | 1.531 | 55.75 |
| 54 | −7.29386 | 2 | — | — |
| 72 | infinite | 9 | 1.569 | 56.13 |
| 74 | infinite | 2 | — | — |
| 82 | infinite | 0.65 | 1.507 | 63.65 |
| 84 | infinite | 0.215649 | — | — |

TABLE 2

| Surface | Aspherical coefficient |
|---|---|
| 12 | K = 0.320546;<br>A4 = 0.000538; A6 = 0.0000013; A8 = 0.000000785;<br>A10 = −0.0000000212; A12 = 0.000000000455 |
| 14 | K = −0.25643;<br>A4 = 0.0000454; A6 = 0.0000175; A8 = −0.000000214;<br>A10 = 0.000000135; A12 = −0.00000000438 |
| 42 | K = −0.19766;<br>A4 = −0.00041; A6 = −0.000014; A8 = 0.00000387;<br>A10 = −0.000000143; A12 = 0.00000000425 |
| 44 | K = 1.155419;<br>A4 = 0.000016; A6 = −0.0001; A8 = 0.0000243;<br>A10 = 0.000000566; A12 = −0.000000211 |
| 52 | K = −0.63995;<br>A4 = −0.00024; A6 = 0.00000392; A8 = −0.0000000303; |
| 54 | A10 = −0.000000000122; A12 = 0.00000000000159<br>K = −0.87795;<br>A4 = 0.000221; A6 = −0.00000112; A8 = 0.0000000339;<br>A10 = 0.000000000282; A12 = −0.0000000000104 |

Figure 2:
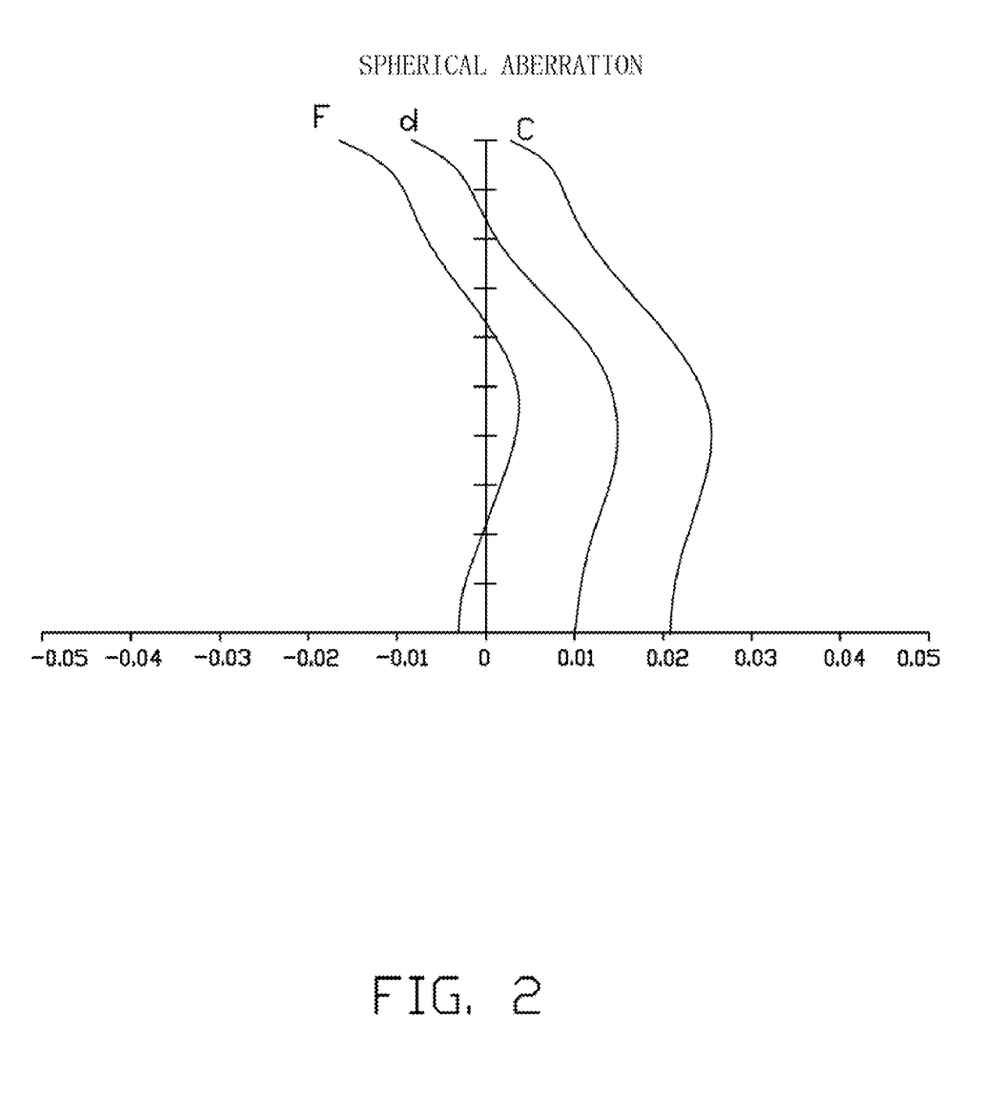
FIG. 2 is a spherical aberration diagram of the projection lens system according to a first exemplary embodiment.
Figure 3:
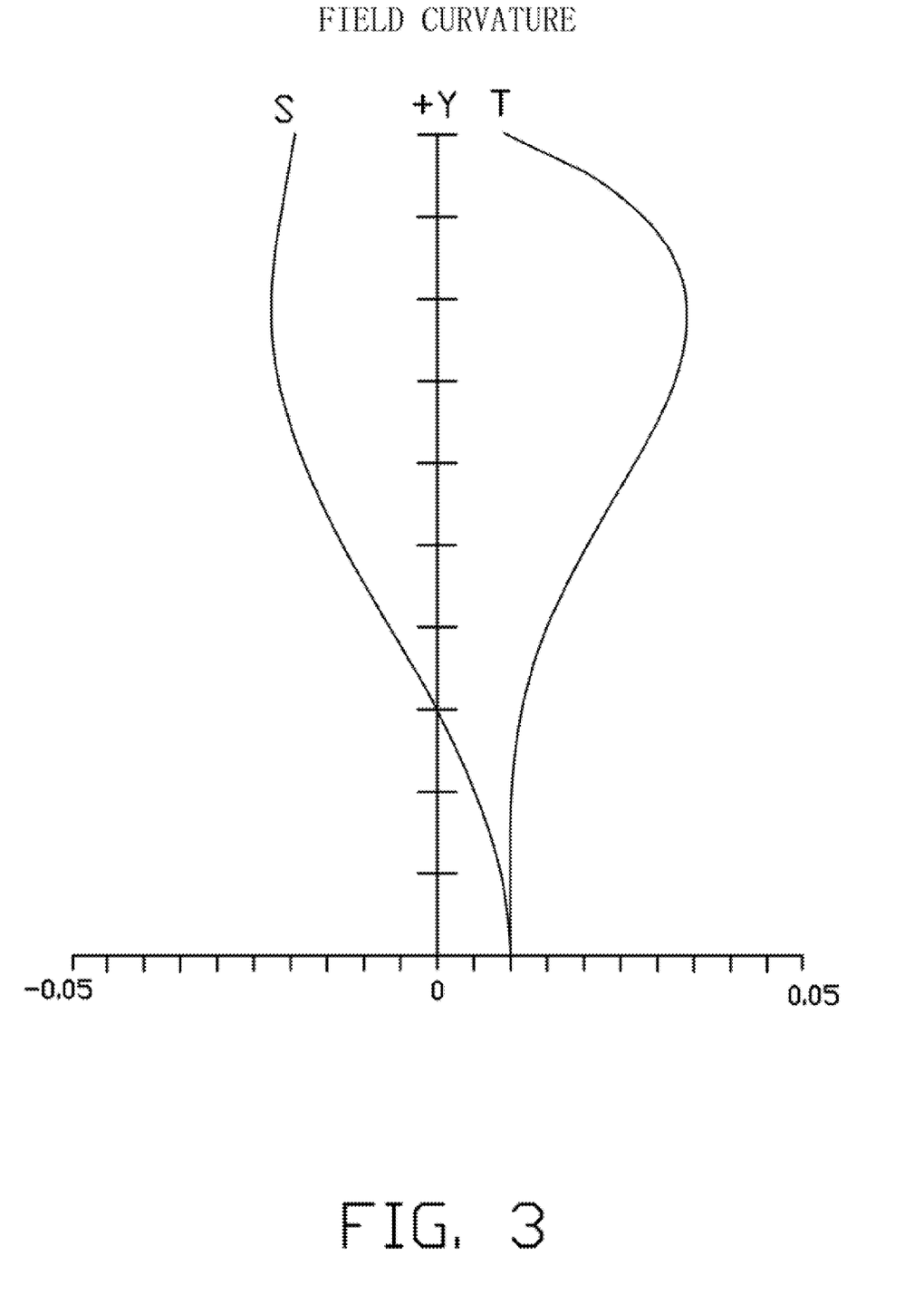
FIG. 3 is a field curvature diagram of the projection lens system according to the first exemplary embodiment.
Figure 4:
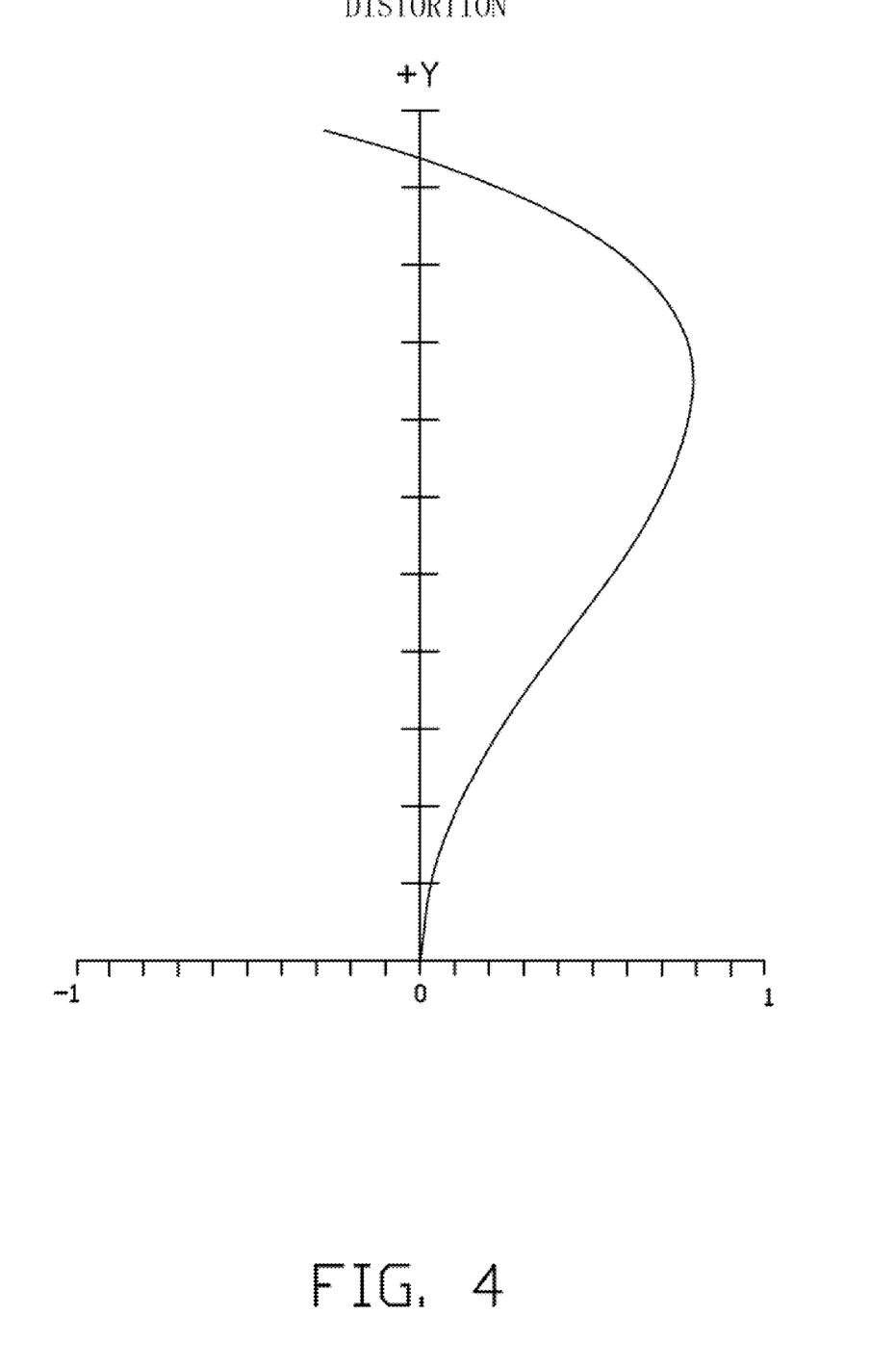
FIG. 4 is a distortion diagram of the projection lens system according to the first exemplary embodiment.

As illustrated in FIG. 2, curves F, d, and C are respectively spherical aberration characteristic curves of f light (wavelength: 625 nm), d light (587 nm), and c light (486 nm) of the projection lens system 100 of Example 1. The spherical aberration of the projection lens system 100 of Example 1 is from −0.05 mm to 0.05 mm. In FIG. 3, the curves T and S are the tangential field curvature curve and the sagittal field curvature curve respectively. The field curvature of the projection lens system 100 of Example 1 is from −0.05 mm to 0.05 mm. In FIG. 4, the distortion of the projection lens system 100 of Example 1 is from −1% to 1%.

In Example 1, though the overall length of the projection lens system 100 is reduced, aberrations of the projection lens system 100 are maintained within an acceptable range. The projection lens system 100 keeps chromatic aberrations at a minimum while reducing the total length of the projection lens system 100.

Embodiment 2: tables 3, 4 show specifications of a second embodiment of the projection lens system 100, wherein f=10.1066, BFL=13.36, $f_5$=10.787902, $F_{No}$=1.97919, $2\omega$=55°.

TABLE 3

| Surface | R (mm) | d (mm) | Nd | V |
|---|---|---|---|---|
| 12 | 12.21465 | 0.8 | 1.531 | 55.75 |
| 14 | 6.656578 | 2.896506 | — | — |
| 22 | 5.142262 | 4.176975 | 1.585 | 29.91 |
| 24 | 6.78623 | 1.288012 | — | — |
| 60 | infinite | 1.998246 | — | — |
| 32 | −4.48536 | 1.523313 | 1.805 | 25.43 |
| 34 (42) | 17.12449 | 3.274008 | 1.804 | 46.57 |
| 44 | −7.61581 | 0.2 | — | — |
| 52 | 11.11574 | 5.478731 | 1.531 | 55.75 |
| 54 | −9.80452 | 2 | — | — |
| 72 | infinite | 9 | 1.569 | 56.13 |
| 74 | infinite | 1.5 | — | — |
| 82 | infinite | 0.65 | 1.507 | 63.35 |
| 84 | infinite | 0.21 | — | — |

TABLE 4

| Surface | Aspherical coefficient |
|---|---|
| 12 | K = 0.326906;<br>A4 = 0.00000413; A6 = −0.0000029; A8 = 0.0000000364;<br>A10 = −0.00000000101; A12 = 0.0000000000236 |
| 14 | K = −0.60578;<br>A4 = −0.0004; A6 = −0.00000628; A8 = 0.000000115;<br>A10 = −0.00000000116; A12 = −0.0000000000175 |
| 42 | K = −0.17578;<br>A4 = −0.0004; A6 = −0.00000547; A8 = 0.000000177;<br>A10 = −0.0000000000886; A12 = 0.000000000508 |
| 44 | K = 1.239063;<br>A4 = 0.000177; A6 = −0.000043; A8 = 0.00000377;<br>A10 = 0.000000994; A12 = −0.0000000804 |
| 52 | K = −0.25807;<br>A4 = −0.00015; A6 = 0.00000083; A8 = −0.00000000999;<br>A10 = 0.0000000000216; A12 = 0.0000000000002 |
| 54 | K = −0.91936;<br>A4 = 0.000237; A6 = −0.00000123; A8 = 0.00000000854;<br>A10 = −0.0000000000688; A12 = 0.000000000000363 |

Figure 5:
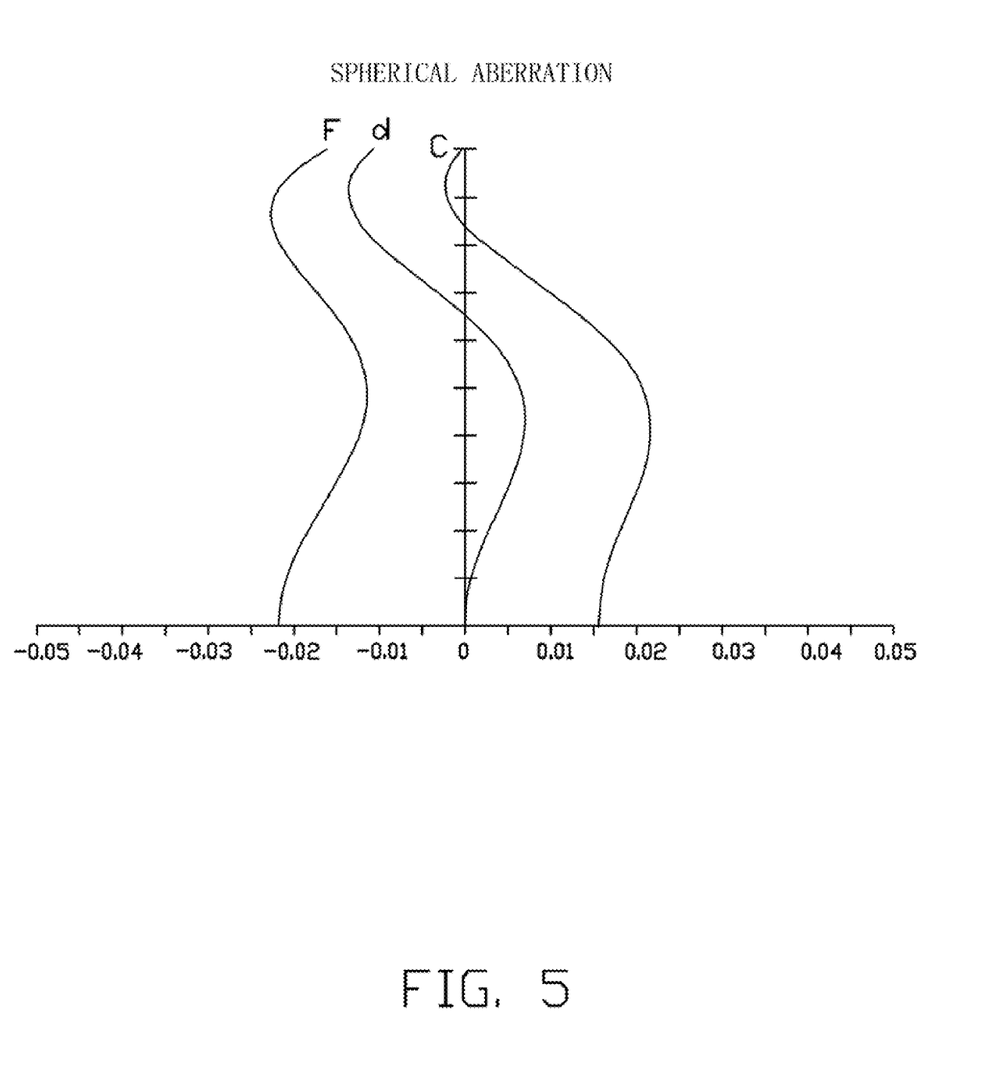
FIG. 5 is a spherical aberration diagram of the projection lens system according to a second exemplary embodiment.
Figure 6:
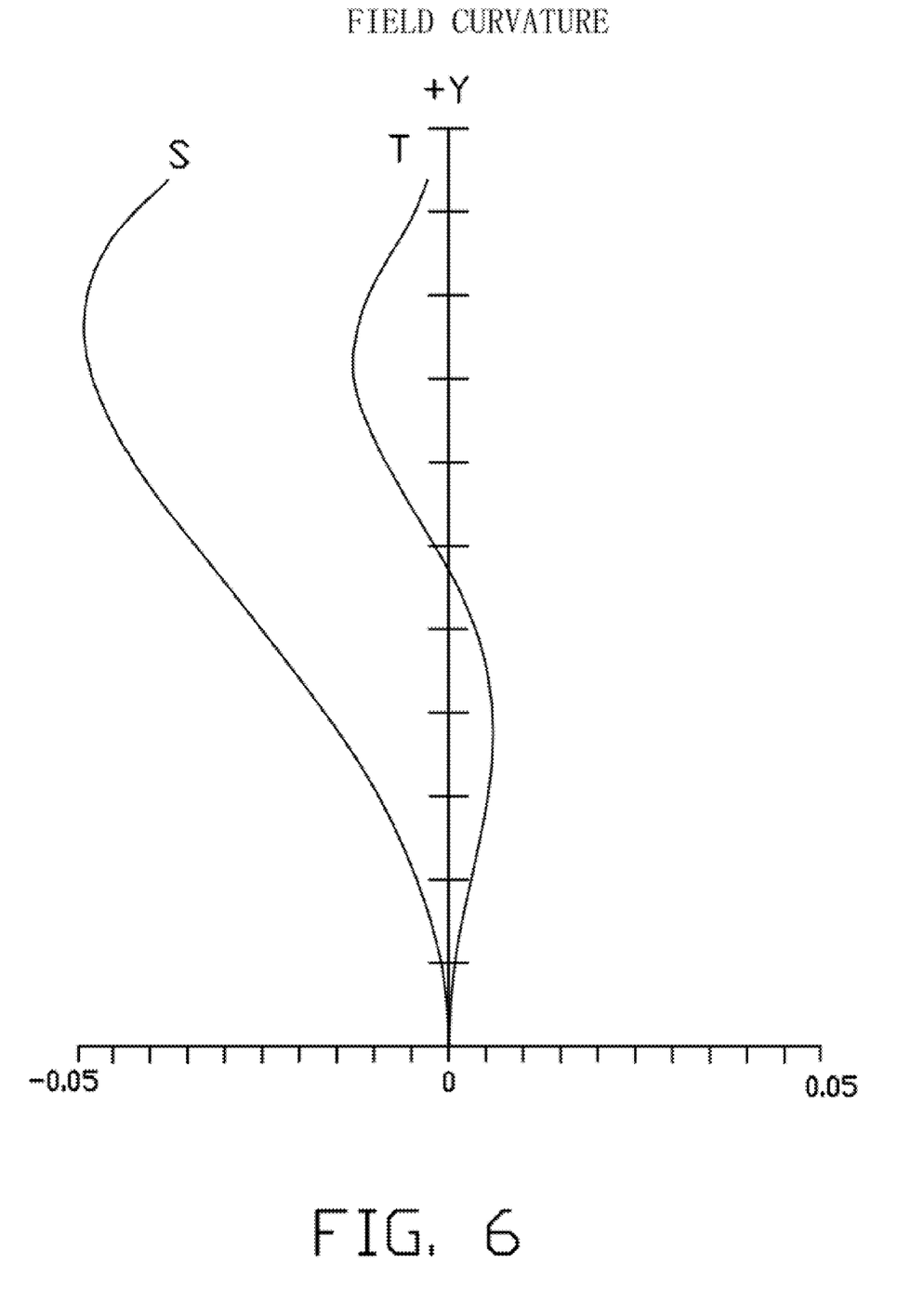
FIG. 6 is a field curvature diagram of the projection lens system according to the second exemplary embodiment.
Figure 7:
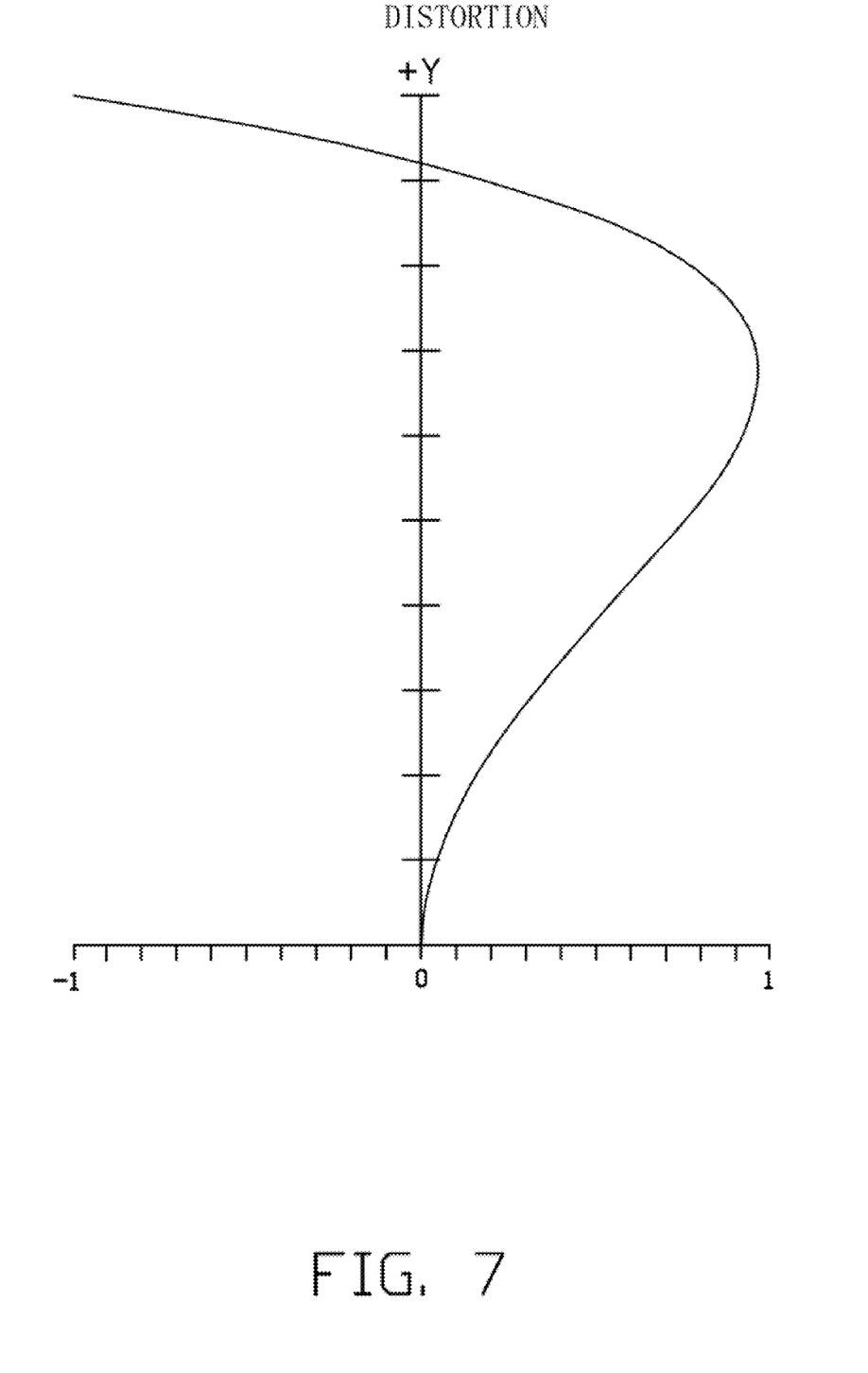
FIG. 7 is a distortion diagram of the projection lens system according to the second exemplary embodiment.

As illustrated in FIG. 5, curves F, d, and C are respectively spherical aberration characteristic curves of f light (wavelength: 625 nm), d light (587 nm), and c light (486 nm) of the projection lens system 100 of Example 2. The spherical aberration of projection lens system 100 of Example 2 is from −0.05 mm to 0.05 mm. In FIG. 6, the curves T and S are the tangential field curvature curve and the sagittal field curvature curve respectively. The field curvature of the projection lens system 100 of Example 2 is from −0.05 mm to 0.05 mm. In FIG. 7, the distortion of the projection lens system 100 of Example 1 is from −1% to 1%.

In example 2, though the overall length of the projection lens system 100 is reduced, aberrations of the projection lens system 100 are maintained within an acceptable range. The projection lens system 100 can keep chromatic aberrations at a minimum while reducing the total length of the projection lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A projection lens system comprising, in order from the magnified end to the minified end thereof, a first lens with negative refraction power, a second lens with positive refraction power, a third lens with negative refraction power, a fourth lens with positive refraction power, and a fifth lens with positive refraction power, wherein the fourth lens and the third lens are integrally bonded to form a compound lens with negative refraction power, and the projection lens system satisfying the following formulae: $0.4<R_{12}/f<0.48$ where $R_{12}$ is a radius of curvature of the surface at the minified-side of the first lens, and f is an effective focal length of the projection lens system.

2. The projection lens system of claim 1, wherein all of the first lens, the second lens and the fifth lens are aspherical lenses.

3. The projection lens system of claim 1, wherein all of the first lens, the second lens and the fifth lens are made of plastic.

4. The projection lens system of claim 1, wherein the projection lens system further satisfies the formula $BFL/f>0.85$, where BFL denotes a back focal length of the projection lens system.

5. The projection lens system of claim 4, wherein the projection lens system further satisfies the formula $0.8<f_5/f<1.2$, where $f_5$ denotes a focal length of the fifth lens.

6. The projection lens system of claim 1, further comprising an aperture stop interposed between the second lens and the third lens.

7. The projection lens system of claim 6, wherein the aperture stop comprises an opaque material on an outer rim of a surface of the third lens on the magnified end.

8. The projection lens system of claim 1, wherein the first lens and the fourth lens are aspherical lenses.

9. The projection lens system of claim 1, wherein both the second lens and the third lens are made of plastic.

* * * * *